United States Patent [19]

Arnoult et al.

[11] Patent Number: 4,781,216
[45] Date of Patent: Nov. 1, 1988

[54] GAS REGULATING VALVE

[75] Inventors: Jean Arnoult, Saint-Nazaire-les-Eymes; Gérard Loiseau, Bois d'Arcy; Maurice Molozay, Le Mesnil-Saint-Denis, all of France

[73] Assignee: L'Air Liquide, Paris, France

[21] Appl. No.: 152,835

[22] Filed: Feb. 5, 1988

[30] Foreign Application Priority Data

Feb. 9, 1987 [FR] France .................. 87 01515

[51] Int. Cl.⁴ .......................................... F16K 11/02
[52] U.S. Cl. ........................ 137/614.19; 251/205; 251/335.3
[58] Field of Search ............... 137/613, 614.19, 903; 251/129.11, 205, 214, 231, 335.3

[56] References Cited

U.S. PATENT DOCUMENTS

| 2,553,991 | 5/1951 | Wagner et al. | 251/231 X |
| 2,980,392 | 4/1961 | Greenwood | 251/903 X |
| 3,054,426 | 9/1962 | Fritz et al. | 251/129.11 X |
| 3,727,406 | 4/1973 | LeFeure | 251/335.3 X |
| 3,794,289 | 2/1974 | Taylor | 137/614.19 X |
| 4,192,348 | 3/1980 | Hansen . | |

FOREIGN PATENT DOCUMENTS

| 2120431 | 11/1972 | Fed. Rep. of Germany . |
| 2306867 | 2/1973 | Fed. Rep. of Germany . |
| 3009388 | 9/1981 | Fed. Rep. of Germany . |
| 247194 | 12/1976 | United Kingdom . |

Primary Examiner—A. Michael Chambers
Assistant Examiner—J. Baja Fox
Attorney, Agent, or Firm—Lee C. Robinson, Jr.

[57] ABSTRACT

In a gas flow regulating valve, the needle (37) axially shifted by a rod (40) includes a recess (70) which is of variable depth and cooperates with an expanding sealing element (43). The valve is provided with a safety closure means comprising a valve member (33) which has a spring (35) and whose displacements are controlled by a free connection tube (30).

4 Claims, 4 Drawing Sheets

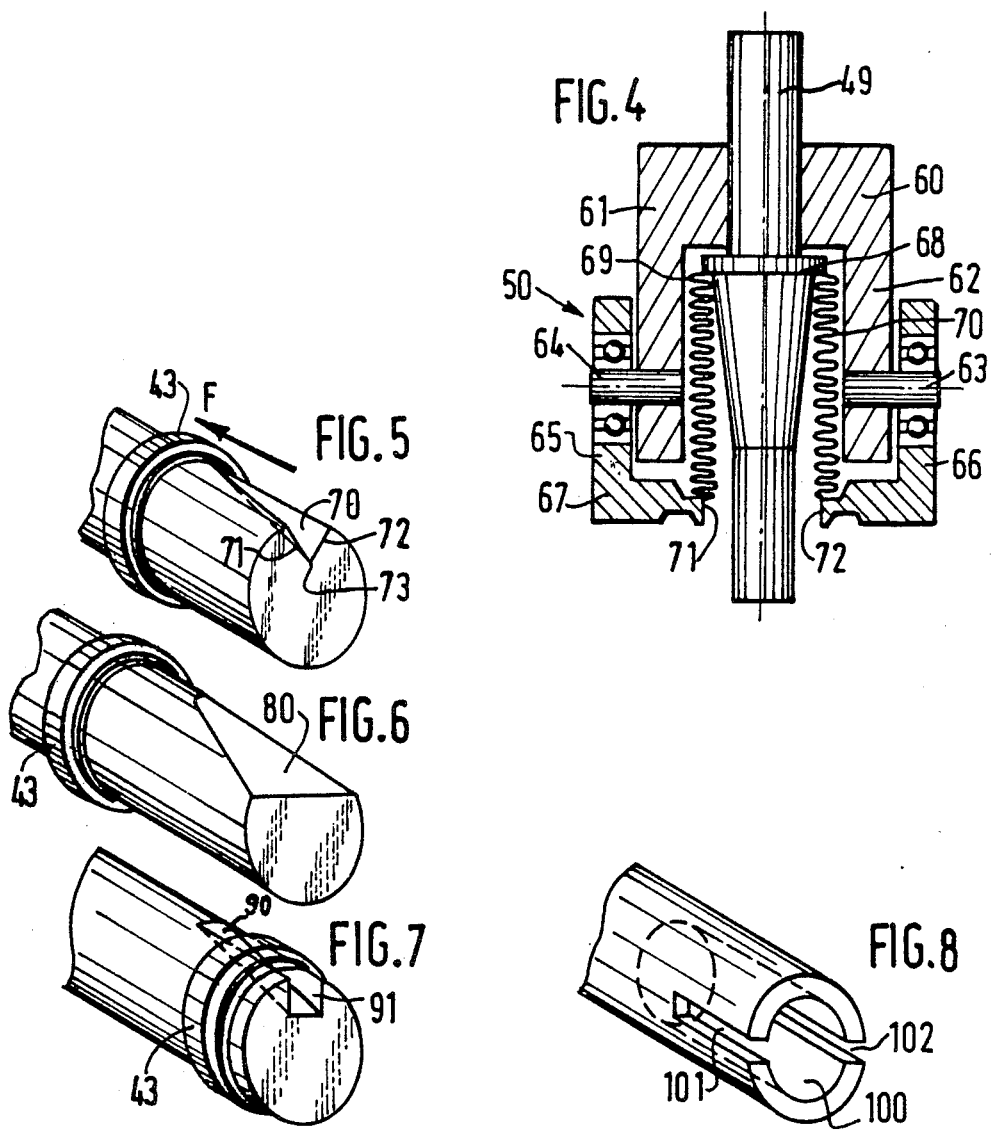

GAS REGULATING VALVE

The present invention relates to a gas regulating valve, particularly a valve for automatically regulating a gas pressure at low rates of flow, arranged in a conduit between a source of gas under pressure and a receiver utilizing gas at a regulated pressure, and more particularly of the type comprising link regulating means having a sealing bellows acting on a valve needle and controlled by an electric motor having a forward or rearward rotation controlled by a differential electronic signal between a reference pressure and a measured regulated pressure, and in which the linkage having a sealing bellows comprises an actuator pivotally mounted on a fixed pin, said actuator having a transverse flange on the periphery of which is fixed in a sealed manner an axial end of a bellows, the other axial end of the bellows being fixed in a sealed manner to a fixed annular support member, the actuator having a control end substantially perpendicular to the rod of the needle. The practical construction of such valves presents considerable difficulties since it must satisfy a large number of requirements some of which may be contradictory from the constructional point of view. Indeed, such a regulating valve must not only be easily controlled, it must have a progressivity in the regulation, high dynamics and, of course, a low cost price, but also a very low rate of leakage to the exterior, a guarantee of high reliability permitting the use of dangerous gases, and moreover, it must not be polluting, i.e., it must be possible to master its initial cleanness by trapping regions and its operation must not produce internal wear, which implies avoiding friction as far as possible. Furthermore, a miniaturized construction is often required. Such requirements are encountered in particular in the semiconductor industry.

Most present valves are incapable of satisfying all of the aforementioned requirements. For example, valves having a sliding seal present risks of leakage and pollution. Valves having a solenoid with a core, termed "wet" valves, have only a low control force involving a limitation in the travel of the needle and are sources of pollution owing to their moving core; they are forbidden for very toxic fluids which may attack the core, of necessity composed of magnetic material. Thermal valves employing the expansion of a solid have the advantages of simplicity, great rigidity and the absence of sliding seals; however, they require a complex control involving difficulties in the measurement of the position of the needle and a very short travel, which in practice does not ensure a correct closure.

It has also been proposed to equip a valve with a control linkage extending through a sealing bellows and acting on the axial position of a valve needle, the control of the valve being governed by a means, for example a reversible electric motor, which is itself controlled by a differential electric signal translating the difference between the regulated pressure and a set or reference pressure. The bellows, and more particularly "welded" bellows, tolerate sufficient travels, but such welded bellows have a limited resistance to pressure and a cleanness difficult to ensure owing to their method of manufacture which involves a very large number of welds and also owing to their shape which includes inaccessible dead regions in the region of each outer weld of the various diaphragms of which they are composed; moreover, such bellows are, in this type of application, mounted in a manner resulting in a single axial extension-compression, which necessitates the use of actuators capable of developing high forces, for example pneumatic jacks or manually controlled screw-andnut systems. This difficulty is further accentuated when it is desired to reduce the overall size of the valve by using bellows of small diameter which have high axial stiffnesses so that a minimum diametrical dimension must be respected.

The present invention provides an arrangement of valves which solves all of these problems and whose control is of the bellows type with the linkage having a sealing bellows and an articulated actuation, comprising a transverse flange on the periphery of which there is fixed in a sealed manner an axial end of the bellows, the other end of the bellows being fixed in a sealed manner to a fixed support member, the control end of the actuator being substantially perpendicular to the axis of the needle which is of the type having a variable longitudinal cavity which is cooperative, for defining a gas passage, with an annular sealing element of the metallic expanding type, said needle exerting a thrust against a rod section connected with a sealed closure valve against the action of a return spring. In this way, there is provided a control of the needle which results, as concerns the bellows, in a simple angular movement substantially without axial extension-compression, which requires, as experience has shown, a very low actuating force and, above all, the intervention of the expanding sealing element has for effect a very correct definition of the passage regulating the rate of flow while accommodating, without being affected thereby, the slight pendular motion of the rod of the needle under the action of the actuator.

The features and advantages of the invention will be apparent from the following description which is given by way of example with reference to the accompanying drawings, in which:

FIG. 4 is a view of a modification of the assembly of the control actuator, and

FIGS. 5, 6, 7 and 8 are perspective views of four embodiments of a valve needle.

Figure 1:
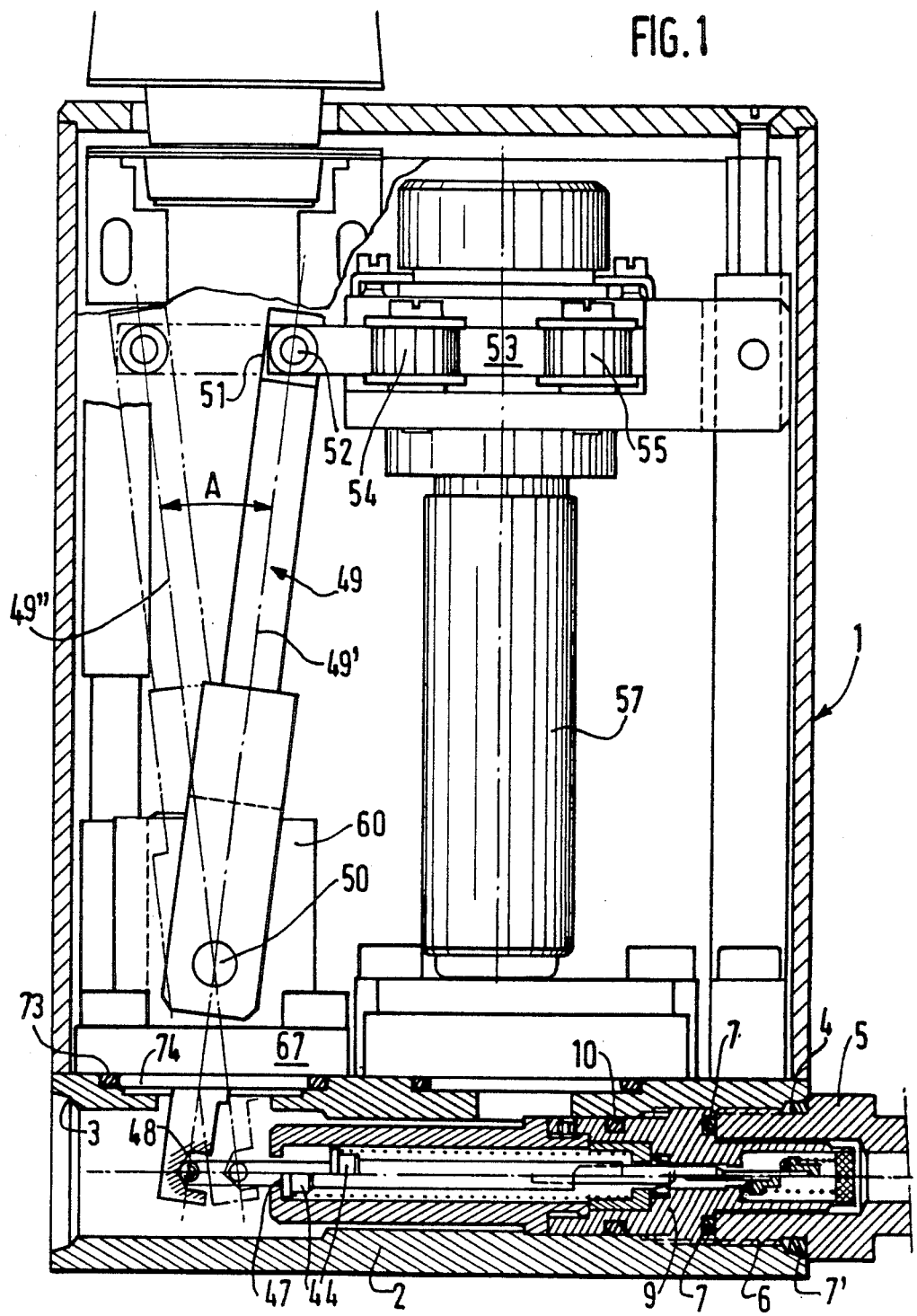
FIG. 1 is an elevational view, partly in section, of a regulated valve according to the invention.
Figure 2:
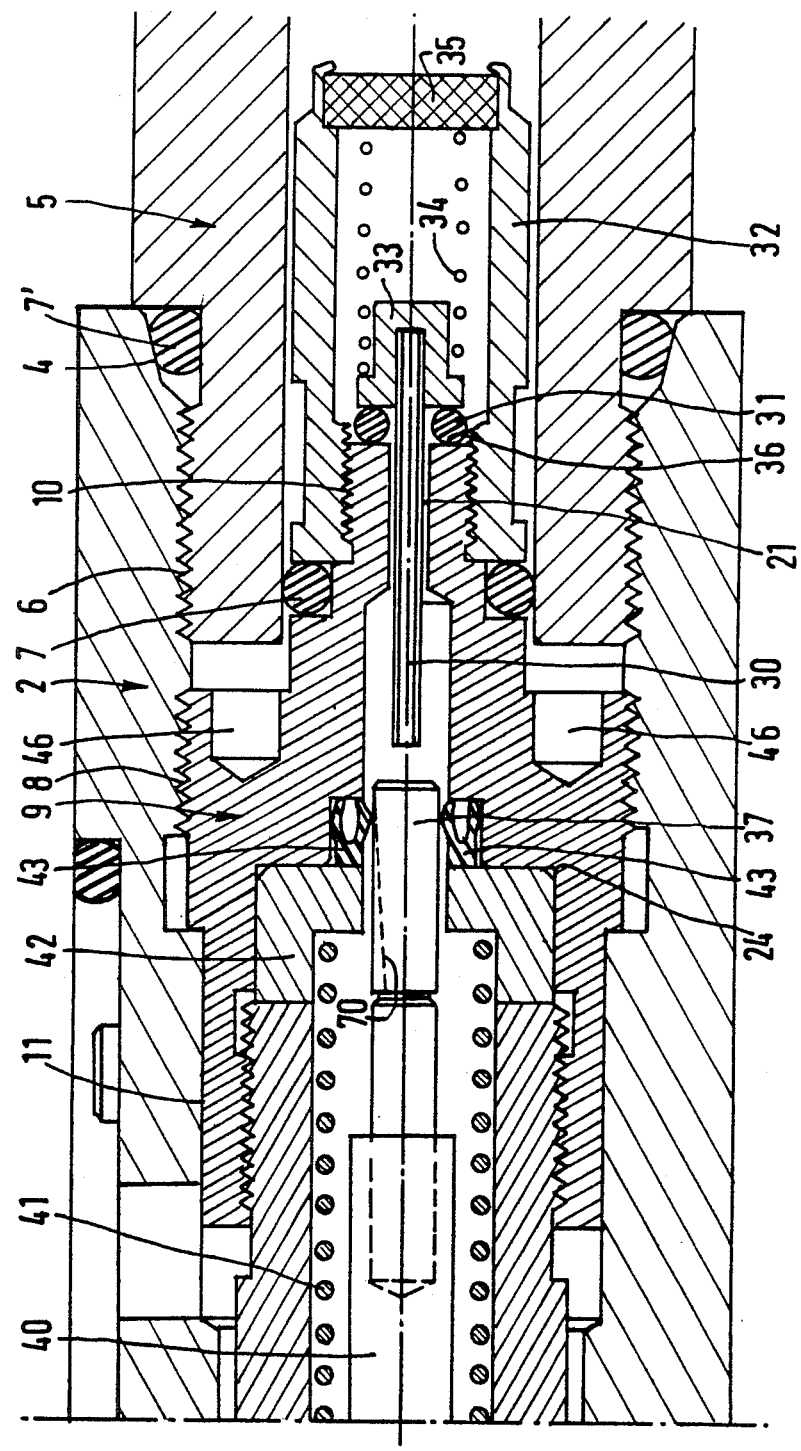
FIGS. 2 and 3 are views, to an enlarged scale, of the valve body proper, in the closed and open position of the valve respectively.
Figure 3:
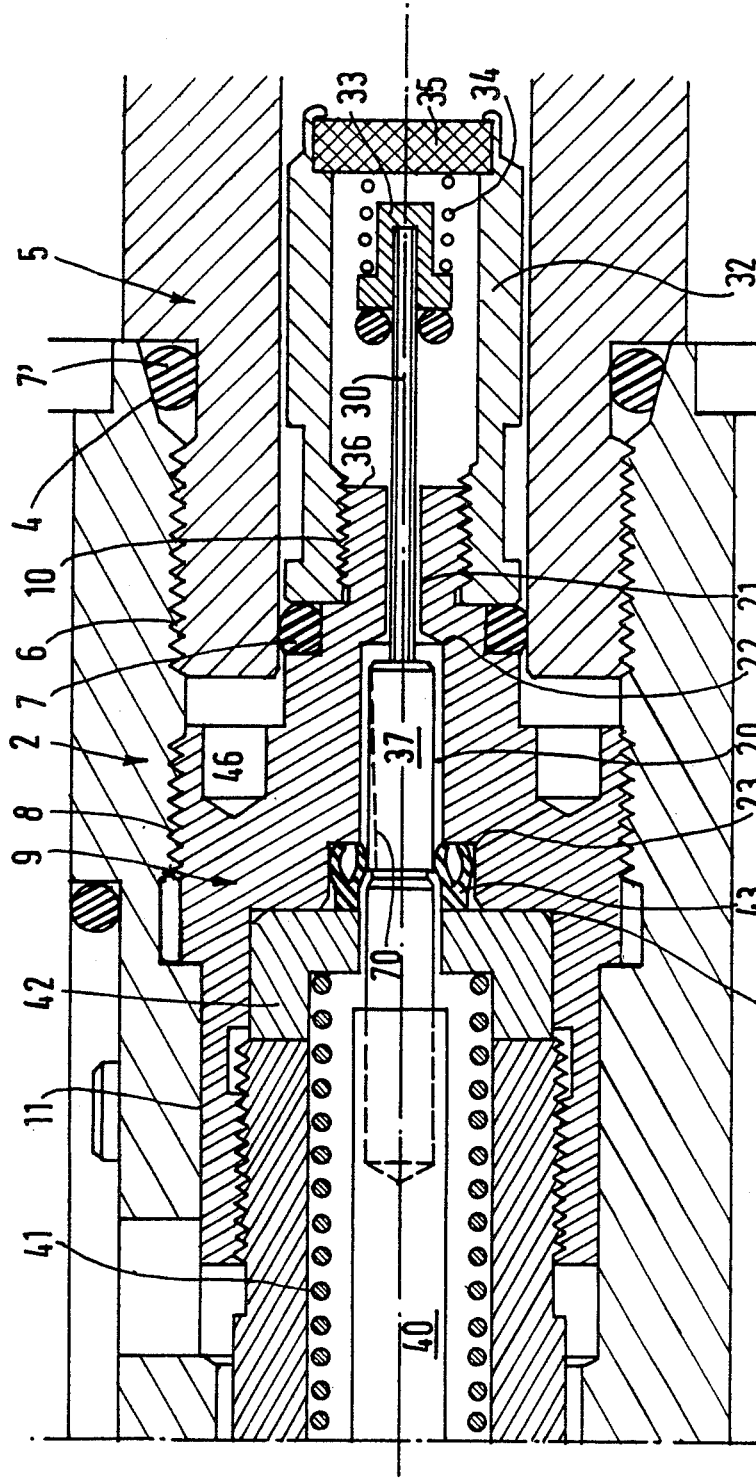

With reference first of all to FIGS. 1 to 3, a regulated valve comprises a housing 1 through which a conduit section 2 extends with an upstream opening 3 to which an inlet connector (not shown) is intended to be connected and a downstream opening 4 for an outlet connector 5 which is screwed in position at 6 with compression of sealing elements 7 and 7'. Screwed at 8 inside the conduit section 2 is a valve body 9 which is slidably engaged in a cylindrical bearing portion 11 of the conduit section 1.

The valve body 9 has an axial passage 20 extending throughout the body with a portion 21 of reduced diameter and shoulders 22, 23, 24. A tube section 30 is freely slidably engaged in the reduced portion 21 of the passage 20 and this tube 30 is freely engaged at one end in a hollow cylindrical valve 33 forming a retaining cage for a compression spring 34 which bears against a porous plug 35 fixed to the end of a downstream conduit section 32 which is screwed in position at 10 on the valve body 9. In the retracted position of the tube 30 (FIG. 2), the valve 33 bears in a sealed manner against a front surface 36 of the valve body 9 through a sealing element 31 permanently mounted on the valve 33.

On the upstream side with respect to the reduced passage 21, a needle 37 is fixed to a control rod 40 on which is mounted a compression spring 41 bearing at one end against an end member 42 bearing against the shoulder 24 with compression of a sealing element 43 which bears against the shoulder 23, and at the other end against a ring 44 adjustable on the control rod 40 of the needle 37. The valve body 9 is screwed in position at 8 in a cylindrical recess formed by the conduit section 2 by means of axial screwing-unscrewing apertures 46. At the upstream end, the body 9 has a throughway passage 47 for the needle rod 40 whose outer end carries a ball 48 bearing in a cavity of an actuator 49.

This actuator 49 is pivotally mounted on a pivot pin 50 and its other end 51 is pivotally mounted on a pin 52 of a control bar 53 guided in simple translation by rollers 54 and 55 under the action of a rack which is engaged with a gear pinion driven by an electric motor 57 capable of rotating in a forward or rearward direction, depending on the sense of the differential control signal corresponding to the difference between a signal formed by a pressure sensor (not shown) but located on the downstream side of the needle 40 and a regulating set or reference signal.

The pivotal mounting 50 of the actuator 49 is shown more specifically in FIG. 4. Mounted on the actuator 49 is a yoke 60 whose two branches 61 and 62 carry trunnions 63, 64 engaged in bearings 65, 66 of a base 67. The actuator 49 has a transverse flange 68 within the yoke 60 to which is welded a longitudinal end 69 of a sealing bellows 70 whose other longitudinal end 71 is welded to the periphery of a circular opening 72 in the base 67, which is fixed around an opening 74 in the conduit section 2 in a sealed manner owing to the provision of a sealing element 73, so that the bellows 70 constitutes with the flange 68 of the actuator or lever 59 a sealed separation between the interior of the conduit section 2 and the outer atmosphere.

The needle 37 is of the type having a longitudinal recess 70 (also see FIG. 5) whose depth increases in the upstream direction, this recess 70 cooperating with the annular sealing element 43 to form a passage which is more or less open, depending on the axial position of the needle 37. This annular sealing element 43 performs a decisive function in the reliability of the valve and for this purpose it is chosen to be of the metallic expanding type engaged in an annular groove of a seal body of plastics material. Such seals are available under various trademarks, for example the seal "OMNISEAL SERIES 103" or "OMNISEAL SERIES 400" of FLUOROCARBON, or the seal "ENERSEAL MARK IV".

The described valve operates in the following manner:

The outer actuator 49 produces a movement of quasi-translation of the control rod 40. Note that the very slight pivotal movements of the rod 40 and its needle 37 are accommodated by the expanding sealing element 43. In a first stage, the movement toward the right of the rod 40 and needle 37 exerts a thrust on the connecting tube 30 freely engaged in the passage 21 forming a sliding bearing surface. This thrust shifts the valve member 33 carried at the end of the tube 30 and causes the sealing element 31 to move away from the front surface 36. In this first position, the recess 70 of the needle 37 is still entirely positioned on the upstream side of the sealing element 43 and there is no possibility of the passage of gas.

The operation for regulating the valve then takes place when the control rod 40 shifts the needle 37 further to the right and thus causes a passage to be uncovered between the needle 37 having the recess 70 and the annular sealing element 43 and this passage has a section which increases as the needle 37 travels to the right. These displacements of the needle 37 in one direction or the other result in the perfect progressivity of the regulation of the rate of flow of the fluid which passes through the free space defined by the section of the recess 70 and the expanding sealing element 43.

As soon as the valve is closed, the needle 37 moves to the left and completely closes any passage in the region of the sealing element 43 and then, after a more accentuated displacement of the rod 40 to the left, the valve 33 bears in a sealed manner by its sealing element 31 against the valve body 9. It will be observed in this respect that the tube 30 permits a balancing of the pressures on each side of the sealing element 31, which enhances its sealing effect.

FIGS. 5 to 8 show four embodiments of a needle 30 according to the invention having a longitudinal recess:

In FIG. 5, the recess is in the form of a groove 70 of triangular cross-sectional shape having two walls 71 and 72, the bottom 73 of the groove extending from the surface of the needle 30 and becoming gradually deeper. It will be understood that a displacement of the needle 30 in the direction of arrow F results in a progressive displacement of the groove 70 within the sealing element 23 which opens a passage of communication of increasing size and therefore results in an increasing rate of flow.

In FIG. 6, the needle has a bevelled surface 80 which also provides the desired progressivity of the opening as a function of the position of the needle relative to the sealing element 43.

In FIG. 7, a rectangular groove 90 of variable depth has the same effect by producing, beyond the sealing element 43, an opening 91 which is increasingly large.

In FIG. 8, a lateral opening effect is achieved with a needle having an end portion which is hollow at 100 and defines two lateral slots 101 and 102.

It will be observed that the interchangeability of the valve body 9 with its internal equipment is particularly easy, since it is sufficient to remove the outlet connector 5 and unscrew the valve body 9 at 8 by rotating it by means of the apertures 46. This withdrawal of the valve body 9 is also facilitated by the connection including a ball 48 between the rod 40 and the actuator 49.

The invention is applicable to the regulation of flows of gas, in particular gas of high purity. In the latter case, the friction members including the ball 48 and its cavity are made from hard material, for example sapphire or ruby.

We claim:

1. A gas regulating valve comprising a valve body defining a passage, a valve needle having an axis and axially movable in said passage, a control rod associated with the needle for shifting the needle, regulating means comprising a linkage having a first end connected to the needle, a forward-rearward rotating electric motor, means connected to the motor for delivering a differential electronic signal based on the difference between a reference pressure and a measure regulated pressure, the linkage having a second end drivenly connected to the motor and comprising an actuator mounted to be pivotable about a fixed axis, said actuator including a transverse flange having a periphery, a sealing bellows having a first axial end and a second axial end which is fixed in a sealed manner to said periphery, a fixed annular support member fixed in a sealed manner to said first axial end of the bellows and fixed relative to the valve body in a sealed manner, the actuator having a control end portion which extends through the annular support member and is substantially perpendicular to said rod of the needle, means for connecting the control end portion of the actuator to said rod, an annular sealing element of a metallic expanding type engaged in the passage and surrounding the needle, the needle having a variable recess extending axially of the needle and cooperative with the annular sealing element for defining with the annular sealing element a gas passage having a section which is variable with the axial position of the needle, a movable second rod, a valve member mounted on the second rod and movable by the second rod to a position for closing said passage, a return spring for biasing the valve member to said passage-closing position, said needle being operative to exert a thrust against and shift the second rod, in opposition to the action of the return spring, for opening the passage when the needle is shifted by the motor through the linkage in a direction for increasing said gas passage section.

2. A regulating valve according to claim 1, wherein the second rod is a hollow tube.

3. A regulating valve according to claim 1, comprising means defining a cavity, the valve body defining apertures for selectively screwing and unscrewing the valve body in the cavity.

4. A regulating valve according to claim 1, comprising means defining a cavity, the valve body being screw-threadedly engaged in the cavity, and an outlet connector screw-threadedly engaged in the cavity with interposition of inner and outer sealing elements between the connector and the valve body and the cavity.

* * * * *